(12) United States Patent
Kobayashi et al.

(10) Patent No.: US 10,415,710 B2
(45) Date of Patent: Sep. 17, 2019

(54) ROTARY VALVE AND FLUID PRESSURE ACTUATOR UNIT INCLUDING ROTARY VALVE

(71) Applicant: KYB-YS CO., LTD., Nagano (JP)

(72) Inventors: Nobuyuki Kobayashi, Nagano (JP); Keiichi Matsuzaki, Nagano (JP)

(73) Assignee: KYB-YS Co., Ltd., Nagano (JP)

( * ) Notice: Subject to any disclaimer, the term of this patent is extended or adjusted under 35 U.S.C. 154(b) by 175 days.

(21) Appl. No.: 15/534,890

(22) PCT Filed: Nov. 26, 2015

(86) PCT No.: PCT/JP2015/083141
§ 371 (c)(1),
(2) Date: Jun. 9, 2017

(87) PCT Pub. No.: WO2016/098549
PCT Pub. Date: Jun. 23, 2016

(65) Prior Publication Data
US 2018/0266572 A1    Sep. 20, 2018

(30) Foreign Application Priority Data

Dec. 16, 2014 (JP) ................................. 2014-254488

(51) Int. Cl.
| | |
|---|---|
| *F16K 3/26* | (2006.01) |
| *F15B 11/04* | (2006.01) |
| *F16K 11/085* | (2006.01) |
| *B60J 7/16* | (2006.01) |
| *B60J 5/04* | (2006.01) |
| *E05F 15/53* | (2015.01) |

(Continued)

(52) U.S. Cl.
CPC ............. *F16K 3/265* (2013.01); *B60J 5/0473* (2013.01); *B60J 7/1621* (2013.01); *E05F 15/53* (2015.01); *F15B 11/04* (2013.01); *F16K 3/26* (2013.01); *F16K 11/0856* (2013.01); *B60J 7/1204* (2013.01); *B60J 7/141* (2013.01); *E05F 3/12* (2013.01); *E05F 3/14* (2013.01);
(Continued)

(58) Field of Classification Search
CPC ............................. F15B 11/042; F15B 11/044
USPC ..................................... 251/207, 209
See application file for complete search history.

(56) References Cited

U.S. PATENT DOCUMENTS 335,719 A * 2/1886 Rein ....................... F23D 11/44
                                          431/225
762,936 A * 6/1904 Paige .................. F16K 37/0016
                                          137/556.6
(Continued)

FOREIGN PATENT DOCUMENTS

DE        2748734 A1    5/1979
EP        2060721 A2    5/2009
(Continued)

*Primary Examiner* — John Fox
(74) *Attorney, Agent, or Firm* — Rabin & Berdo, P.C.

(57) ABSTRACT

A rotary valve that controls a flow rate at which working oil is supplied to and discharged from a hydraulic cylinder that causes a wing to rotate about a rotary shaft includes a rotor that rotates as the wing rotates about the rotary shaft, and a first control flow passage and a second control flow passage formed in the rotor to control the flow rate at which the working fluid is supplied to and discharged from the hydraulic cylinder, wherein the first control flow passage and the second control flow passage respectively vary a resistance exerted on a flow of the working fluid passing therethrough as the rotor rotates.

9 Claims, 11 Drawing Sheets

(51) Int. Cl.
*E05F 3/12* (2006.01)
*E05F 15/51* (2015.01)
*B60J 7/12* (2006.01)
*B60J 7/14* (2006.01)
*E05F 3/14* (2006.01)
*F16K 3/32* (2006.01)
*F16K 5/10* (2006.01)

(52) U.S. Cl.
CPC ......... *E05F 15/51* (2015.01); *E05Y 2900/516* (2013.01); *F16K 3/32* (2013.01); *F16K 5/10* (2013.01)

(56) References Cited

U.S. PATENT DOCUMENTS

| | | | |
|---|---|---|---|
| 926,774 A * | 7/1909 | Scmidt | F16K 31/56 251/109 |
| 3,386,461 A * | 6/1968 | Fisher | F16K 5/10 137/237 |
| 3,705,631 A | 12/1972 | Seaberg | |
| 4,391,265 A * | 7/1983 | Chen | F23N 1/005 126/39 E |
| 6,308,739 B1 | 10/2001 | Barbuto et al. | |
| 2005/0146252 A1* | 7/2005 | Chuang | F15B 11/042 312/223.2 |
| 2006/0175566 A1 | 8/2006 | Albizuri | |
| 2013/0035828 A1* | 2/2013 | Tamura | B60P 1/162 701/50 |
| 2013/0260327 A1 | 10/2013 | Oliva Aguayo et al. | |
| 2014/0252253 A1 | 9/2014 | Huang et al. | |

FOREIGN PATENT DOCUMENTS

| | | |
|---|---|---|
| JP | 120065 C2 | 5/1937 |
| JP | 2009-208526 A | 9/2009 |
| JP | 2014-202312 A | 10/2014 |

* cited by examiner

ROTARY VALVE AND FLUID PRESSURE ACTUATOR UNIT INCLUDING ROTARY VALVE

TECHNICAL FIELD

The present invention relates to a rotary valve and a fluid pressure actuator unit including the rotary valve.

BACKGROUND ART

JP2009-208526A discloses a roof opening/closing control device for a wing vehicle, which opens and closes left and right roofs of a wing vehicle using a hydraulic cylinder. In the roof opening/closing control device disclosed in JP2009-208526A, a rotation speed of a motor is controlled on the basis of information indicating a roof angle, whereupon an amount of working oil supplied to the hydraulic cylinder is controlled. In the roof opening/closing device disclosed in JP2009-208526A, roof opening/closing operations can be started and stopped gently by controlling the amount of working oil supplied to the hydraulic cylinder.

SUMMARY OF INVENTION

When a defect occurs in a sensor that detects angle information in relation to a drive subject or the like in a case where a flow rate at which a working fluid is supplied from a pump to a fluid pressure cylinder is controlled by controlling the rotation speed of a motor, as in the roof opening/closing control device disclosed in JP2009-208526A, the controllability of the fluid pressure cylinder may deteriorate.

An object of the present invention is to improve the controllability of a fluid pressure actuator that causes a drive subject to rotate about a rotary shaft.

According to one aspect of the present invention, a rotary valve for controlling a flow rate at which a working fluid is supplied to and discharged from a fluid pressure actuator that causes a drive subject to rotate about a rotary shaft, includes a rotor that is configured to rotate as the drive subject rotates about the rotary shaft; and a control flow passage formed in the rotor to control the flow rate at which the working fluid is supplied to and discharged from the fluid pressure actuator. The control flow passage varies a resistance exerted on a flow of the working fluid passing therethrough as the rotor rotates.

DESCRIPTION OF EMBODIMENTS

First Embodiment

A rotary valve 100 and a fluid pressure actuator unit 10 including the rotary valve 100 according to a first embodiment of the present invention will be described below with reference to the figures.

Figure 1:
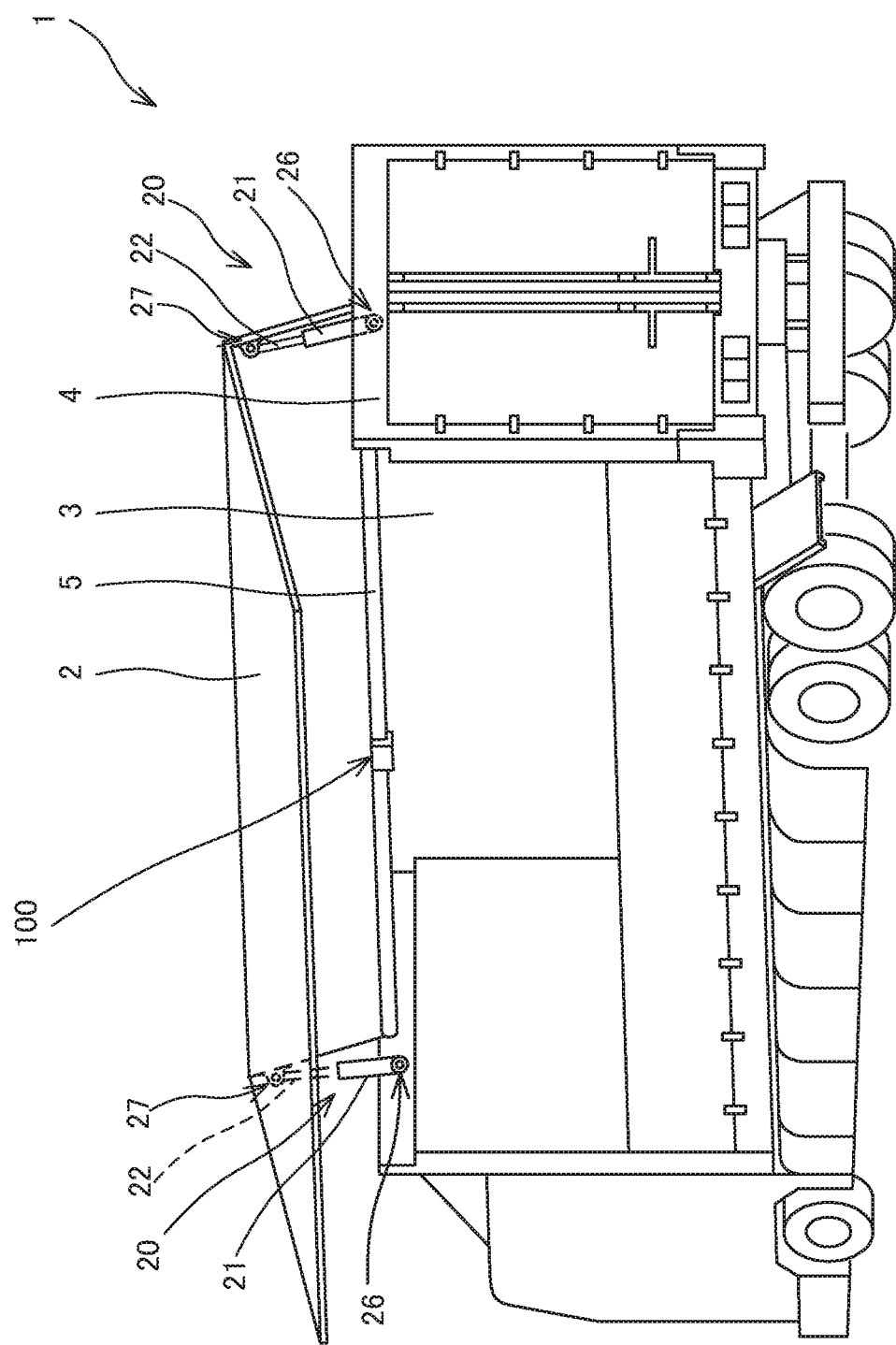
FIG. 1 is a perspective view of a wing vehicle including a fluid pressure actuator unit according to a first embodiment of the present invention.

The fluid pressure actuator unit 10 causes a drive subject to rotate about a rotary shaft by driving a fluid pressure actuator using the fluid pressure of a working fluid. As shown in FIG. 1, a case in which the drive subject takes the form of wings 2, 3 of a wing vehicle 1, wherein the wings 2, 3 are coupled to an upper portion of a cargo compartment 4 to be free to rotate and are opened and closed by being caused to rotate vertically about a rotary shaft 5, will be described below.

As shown in FIG. 1, the fluid pressure actuator unit 10 is installed in the wing vehicle 1, which includes the left-right pair of wings 2, 3 covering the cargo compartment 4, and is used in a wing opening/closing device for opening and closing the left-right pair of wings 2, 3. The left-side wing 2 is coupled to the cargo compartment 4 to be free to rotate about the rotary shaft 5, which is provided in the upper portion of the cargo compartment 4. Similarly, the right-side wing 3 is coupled to the cargo compartment 4 to be free to rotate about a rotary shaft (not shown) provided in the upper portion of the cargo compartment 4.

Figure 2:
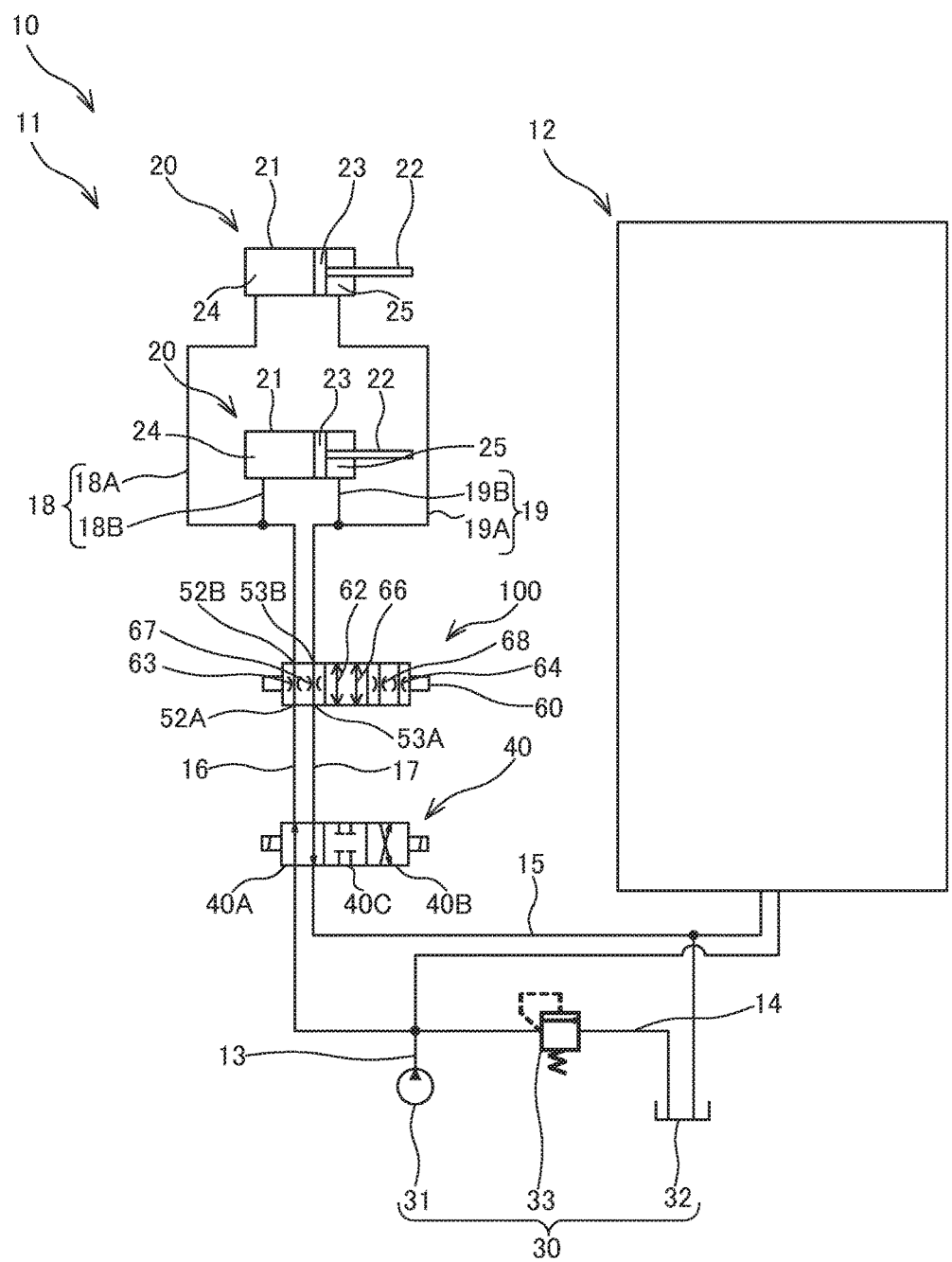
FIG. 2 is a view showing a hydraulic circuit of the fluid pressure actuator unit according to the first embodiment of the present invention.

As shown in FIG. 2, the fluid pressure actuator unit 10 includes a left wing drive unit 11 for opening and closing the left-side wing 2 and a right wing drive unit 12 for opening and closing the right-side wing 3.

In the fluid pressure actuator unit 10, the left wing drive unit 11 and the right wing drive unit 12 have similar configurations and perform similar operations. Accordingly, the configuration of the right wing drive unit 12 is not shown in FIG. 2. Moreover, the following description will focus mainly on the left wing drive unit 11, and description of the right wing drive unit 12 will be omitted. Furthermore, hereafter, the left wing drive unit 11 will be referred to simply as "the drive unit 11", and the left-side wing 2 will be referred to simply as "the wing 2".

The drive unit 11 includes a pair of hydraulic cylinders 20 that serve as fluid pressure actuators and are caused to perform expansion and contraction operations by the fluid pressure of working oil serving as the working fluid, a pump 31 for supplying the working oil to the pair of hydraulic cylinders 20, a switch valve 40 for switching a flow of the working oil led to the pair of hydraulic cylinders 20 from the pump 31, the rotary valve 100 for controlling a flow rate at which the working oil is led to the pair of hydraulic cylinders 20, and a tank 32 to which working oil discharged from the pair of hydraulic cylinders 20 is led.

One of the pair of hydraulic cylinders 20 is mounted on a vehicle front side of the wing 2, and the other is mounted on a vehicle rear side of the wing 2 (see FIG. 1). When the pair of hydraulic cylinders 20 perform expansion and contraction operations in synchronization with each other, the wing 2 rotates about the rotary shaft 5 so as to be opened and closed vertically.

Each hydraulic cylinder 20 includes a cylindrical cylinder 21, a piston rod 22 inserted into the cylinder 21, and a piston 23 provided on an end portion of the piston rod 22 so as to slide against an inner peripheral surface of the cylinder 21.

The interior of the cylinder 21 is partitioned by the piston 23 into a first pressure chamber 24 and a second pressure chamber 25. The working oil is charged into the first pressure chamber 24 and the second pressure chamber 25.

As shown in FIG. 1, an end portion of the cylinder 21 on an opposite side to the piston rod 22 is fixed to a predetermined position in the upper portion of the cargo compartment 4 via a mounting member 26 to be free to rotate. A tip end portion of the piston rod 22 is fixed to the wing 2 via a coupling member 27 to be free to rotate. As the wing 2 opens and closes in response to the expansion and contraction operations of the hydraulic cylinder 20, the cylinder 21 rotates about the mounting member 26.

As shown in FIG. 2, the pump 31 is driven to rotate by an electric motor (not shown) in order to discharge pressurized working oil through a discharge passage 13. A relief passage 14 is connected to the discharge passage 13 so as to bifurcate therefrom. A relief valve 33 is provided in the relief passage 14. The relief valve 33 maintains the pressure in the discharge passage 13 at or below a predetermined value by opening when the pressure of the working oil in the discharge passage 13 reaches the predetermined value so that the working oil in the discharge passage 13 is discharged and released into the tank 32.

A pump unit 30 constituted by the pump 31, the tank 32, and the relief valve 33 is shared by the left wing drive unit 11 and the right wing drive unit 12. The pump unit 30 is housed under the floor of the cargo compartment 4, and supplies and discharges the working oil to and from the pair of hydraulic cylinders 20 through a pipe (not shown).

The switch valve 40 is a four-port, three-position solenoid switch valve, the position of which is switched by exciting a solenoid. The discharge passage 13, which communicates with the pump 31, and a discharge passage 15 that communicates with the tank 32 are connected to ports on one side of the switch valve 40. A first main passage 16 for transporting the working oil that is supplied to and discharged from the first pressure chambers 24 of the pair of hydraulic cylinders 20 and a second main passage 17 for transporting the working oil that is supplied to and discharged from the second pressure chambers 25 of the pair of hydraulic cylinders 20 are connected to ports on the other side of the switch valve 40.

By switching the switch valve 40 between the respective positions, communication conditions between the discharge passage 13 and discharge passage 15 and the first main passage 16 and second main passage 17 are switched. More specifically, the switch valve 40 includes a first position 40A in which the discharge passage 13 communicates with the first main passage 16 and the second main passage 17 communicates with the discharge passage 15, a second position 40B in which the second main passage 17 communicates with the discharge passage 13 and the first main passage 16 communicates with the discharge passage 15, and a cutoff position 40C in which communication between the first main passage 16 and second main passage 17 and the discharge passage 13 and discharge passage 15 is cut off. The switch valve 40 is a normally closed valve that remains in the cutoff position when demagnetized.

The first main passage 16 bifurcates into a front side first main passage 18A connected to the first pressure chamber 24 of the front side hydraulic cylinder 20, and a rear side first main passage 18B connected to the first pressure chamber 24 of the rear side hydraulic cylinder 20. Hereafter, the front side first main passage 18A and the rear side first main passage 18B will be referred to together as "the first connection passage 18".

The second main passage 17 bifurcates into a front side second main passage 19A connected to the second pressure chamber 25 of the front side hydraulic cylinder 20, and a rear side second main passage 19B connected to the second pressure chamber 25 of the rear side hydraulic cylinder 20. Hereafter, the front side second main passage 19A and the rear side second main passage 19B will be referred to together as "the second connection passage 19".

The pair of hydraulic cylinders 20 are configured such that when the switch valve 40 is switched to the first position 40A, working oil is supplied to the respective first pressure chambers 24 through the first main passage 16 and the first connection passage 18, and working oil is discharged from the respective second pressure chambers 25 through the second connection passage 19 and the second main passage 17. As a result, the hydraulic cylinders 20 perform an expansion operation.

Further, the pair of hydraulic cylinders 20 are configured such that when the switch valve 40 is switched to the second position 40B, working oil is supplied to the respective second pressure chambers 25 through the second main passage 17 and the second connection passage 19, and working oil is discharged from the respective first pressure chambers 24 through the first connection passage 18 and the first main passage 16. As a result, the hydraulic cylinders 20 perform a contraction operation.

Hence, in the pair of hydraulic cylinders 20, working oil is supplied to and discharged from the respective first pressure chambers 24 and second pressure chambers 25 through the first connection passage 18 and the second connection passage 19 bifurcating respectively from the first main passage 16 and the second main passage 17. As a result, the pair of hydraulic cylinders 20 perform expansion and contraction operations in synchronization with each other using a differential pressure between the first pressure chamber 24 and the second pressure chamber 25.

The rotary valve 100 controls the flow rate at which the working oil passes through the first main passage 16 and the second main passage 17. As shown in FIG. 1, the rotary valve 100 is provided in the upper portion of the cargo compartment 4 of the wing vehicle 1 substantially centrally in a front-rear direction.

The first main passage 16 bifurcates into the front side first main passage 18A and the rear side first main passage 18B substantially centrally in the front-rear direction of the wing vehicle 1. A pipe (not shown) constituting the front side first main passage 18A and a pipe (not shown) constituting the rear side first main passage 18B can therefore be formed at an identical length. The second main passage 17 likewise bifurcates into the front side second main passage 19A and the rear side second main passage 19B substantially centrally in the front-rear direction of the wing vehicle 1. A pipe (not shown) constituting the front side second main passage 19A and a pipe (not shown) constituting the rear side second main passage 19B can therefore be formed at an identical length. Accordingly, substantially no difference in pressure loss occurs in the working oil in the respective pipes connecting the rotary valve 100 to the pair of hydraulic cylinders 20. As a result, the pair of hydraulic cylinders 20 can perform expansion and contraction operations in synchronization with each other more reliably.

The rotary valve 100 will now be described in detail with reference to FIGS. 3-5.

Figure 3:
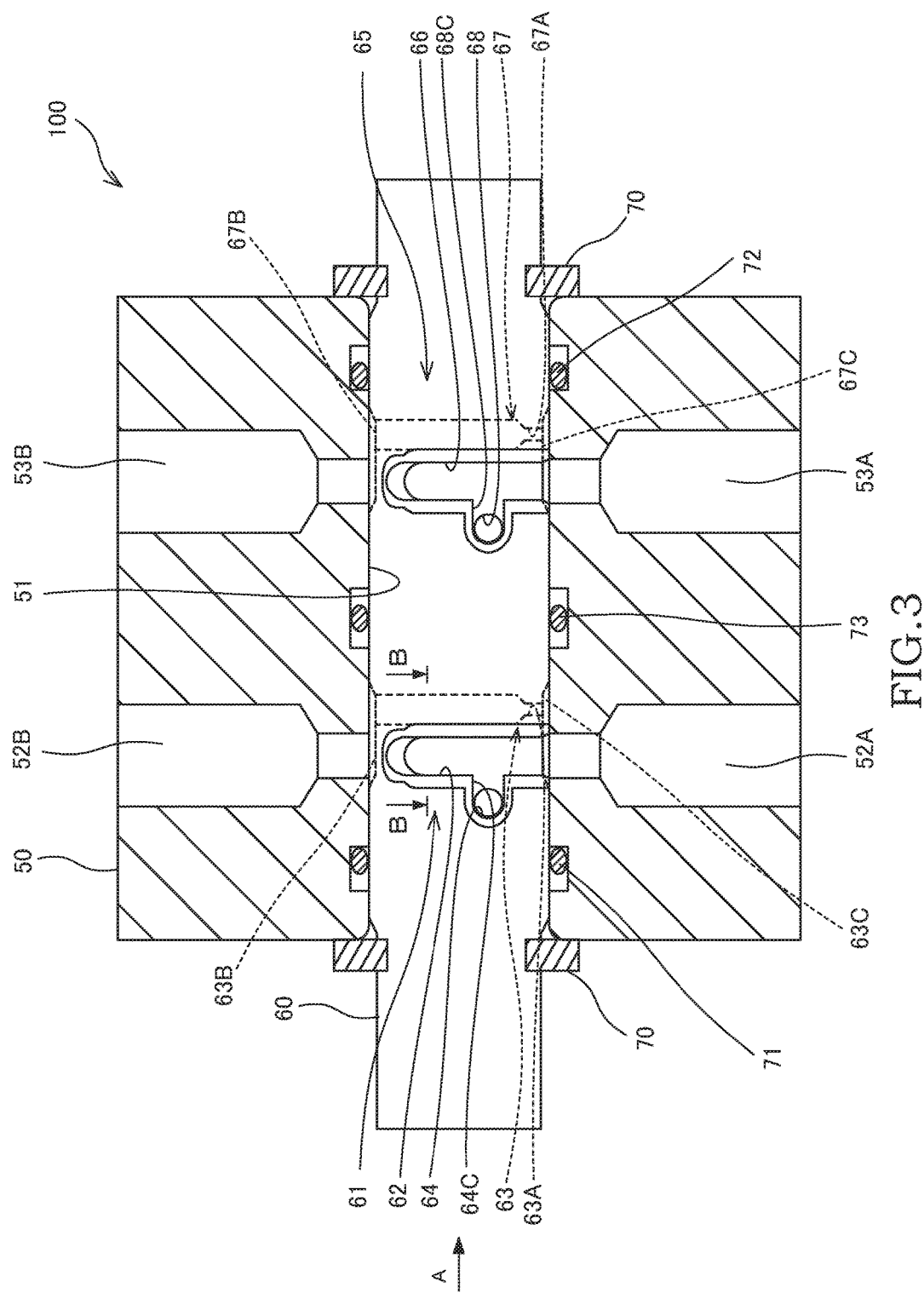
FIG. 3 is a sectional view showing a rotary valve according to the first embodiment of the present invention.

As shown in FIG. 3, the rotary valve 100 includes a single housing 50, and a single rotor 60 that is inserted into the housing 50 to be free to rotate, and rotates as the wing 2 rotates about the rotary shaft 5.

The housing 50 is provided with a rotor housing hole 51 that is formed as a through hole having a circular cross-section and houses the rotor 60 to be free to rotate, a pair of first ports 52A, 52B that communicate with the rotor housing hole 51 and form a part of the first main passage 16 for supplying and discharging the working oil to and from the first pressure chambers 24, and a pair of second ports 53A, 53B that communicate with the rotor housing hole 51 and form a part of the second main passage 17 for supplying and discharging the working oil to and from the second pressure chambers 25. The pair of first ports 52A, 52B oppose each other on either side of the rotor 60. The pair of second ports 53A, 53B also oppose each other on either side of the rotor 60. The first ports 52A, 52B and the second ports 53A, 53B are respectively arranged side by side in an axial direction of the rotor 60.

The first port 52A of the pair of first ports 52A, 52B is connected to the switch valve 40, and the first port 52B is connected to the first pressure chambers 24 of the hydraulic cylinders 20. Working oil is supplied to or discharged from the first pressure chambers 24 through the first ports 52A, 52B in accordance with the position of the switch valve 40.

One second port 53A of the pair of second ports 53A, 53B is connected to the switch valve 40, and the other second port 53B is connected to the second pressure chambers 25 of the pair of hydraulic cylinders 20. Working oil is supplied to or discharged from the second pressure chambers 25 through the second ports 53A, 53B in accordance with the position of the switch valve 40.

The rotor 60 is inserted into the rotor housing hole 51 to be capable of sliding in a circumferential direction and such that respective end portions thereof project to the outside of the housing 50. The rotor 60 is coupled coaxially to the rotary shaft 5 of the wing 2. Accordingly, the rotor 60 rotates while sliding along an inner peripheral surface of the rotor housing hole 51 as the rotary shaft 5 rotates, or in other words as the wing 2 opens and closes.

Two snap rings 70 are provided on an outer periphery of the rotor 60 as retainers for preventing the rotor 60 from slipping out of the rotor housing hole 51. As a result, the rotor 60 is housed in the rotor housing hole 51 of the housing 50 to be free to rotate and such that axial direction movement thereof is restricted. The retainers are not limited to the snap rings 70, and nut members that are screwed to male screws formed on the respective end portions of the rotor 60, for example, may be used instead. Further, large diameter portions having a larger outer diameter than the diameter of the rotor housing hole 51 may be formed on the respective end portions of the rotor 60 and used as retainers.

The housing 50 is provided with a first seal member 71, a second seal member 72, and a third seal member 73 that are housed in annular sealing grooves formed in the inner peripheral surface of the rotor housing hole 51 in order to seal a gap between the housing 50 and the rotor 60.

The first seal member 71 is provided between one end portion (a left-side end portion in FIG. 3) of the housing 50 and the first ports 52A, 52B. The second seal member 72 is provided between the other end portion (a right-side end portion in FIG. 3) of the housing 50 and the second ports 53A, 53B. The third seal member 73 is provided between the first ports 52A, 52B and the second ports 53A, 53B.

By providing the first seal member 71 and the second seal member 72, the working oil passing through the first ports 52A, 52B and the second ports 53A, 53B is prevented from leaking to the outside of the housing 50 through a gap between the rotor 60 and the housing 50. Further, by providing the third seal member 73, the first ports 52A, 52B and the second ports 53A, 53B are prevented from communicating with each other through a gap between the rotor 60 and the housing 50.

A first control flow passage 61 and a second control flow passage 65 are formed in the rotor 60 as control flow passages for controlling the flow rate at which the working oil is supplied to and discharged from the pair of hydraulic cylinders 20.

The first control flow passage 61 is interposed in the first main passage 16 in order to connect the pair of first ports 52A, 52B to each other as the rotor 60 rotates. The first control flow passage 61 includes a first groove passage 62 serving as a groove passage formed in an outer periphery of the rotor 60 so as to extend in the circumferential direction, and two first throttle passages 63, 64 serving as throttle passages that open at both ends onto the outer peripheral surface of the rotor 60. The first throttle passages 63, 64 exert greater resistance on the flow of working oil than the resistance exerted on the flow of working oil by the first groove passage 62. Thus, the first groove passage 62 and the first throttle passages 63, 64 respectively exert different resistance on the working oil.

As the rotor 60 rotates, the first control flow passage 61 switches between connecting the first port 52A and the first port 52B to each other through the first throttle passage 63, 64, through the first groove passage 62, and through both the first groove passage 62 and the first throttle passage 63, 64. Accordingly, the resistance exerted on the working oil by the first control flow passage 61 as a whole is varied, and as a result, the flow rate at which the working oil passes through the first main passage 16 is controlled.

The second control flow passage 65 is interposed in the second main passage 17 in order to connect the pair of second ports 53A, 53B to each other as the rotor 60 rotates. The second control flow passage 65 includes a second groove passage 66 serving as a groove passage formed in the outer periphery of the rotor 60 so as to extend in the circumferential direction, and two second throttle passages 67, 68 serving as throttle passages that open at both ends onto the outer peripheral surface of the rotor 60. The second throttle passages 67, 68 exert greater resistance on the flow of working oil passing therethrough than the resistance exerted on the flow of working oil by the second groove passage 66. Thus, the second groove passage 66 and the second throttle passages 67, 68 respectively exert different resistance on the working oil.

As the rotor 60 rotates, the second control flow passage 65 switches between connecting the second port 53A and the second port 53B to each other through the second throttle passage 67, 68, through the second groove passage 66, and through both the second groove passage 66 and the second throttle passage 67, 68. Accordingly, the resistance exerted on the working oil by the second control flow passage 65 as a whole varies, and as a result, the flow rate at which the working oil passes through the second main passage 17 is controlled.

Here, the first control flow passage 61 and the second control flow passage 65 have similar configurations. Therefore, specific configurations of the first control flow passage 61 will be described below as an example with reference to FIGS. 3-5. It should be noted that in FIGS. 4 and 5, reference numerals in parentheses denote configurations of the second control flow passage 65 corresponding to configurations of the first control flow passage 61. FIG. 4 is a view seen in the direction of an arrow A in FIG. 3 and showing a case in which the wing 2 is in a fully closed condition. It should be noted that the snap rings 70 are not shown in FIG. 4.

As shown in FIG. 3, the first groove passage 62 is formed such that a central width position thereof in the axial direction of the rotor 60 is substantially aligned with respective centers of the first ports 52A, 52B. Further, as shown in FIG. 4, the first groove passage 62 is formed to extend in the circumferential direction of the rotor 60 over a predetermined angle range of no less than 180° in order to connect the first ports 52A, 52B. Hence, when the rotor 60 rotates, the first groove passage 62 opposes the first ports 52A, 52B so as to connect the first ports 52A, 52B to each other.

Figure 5:
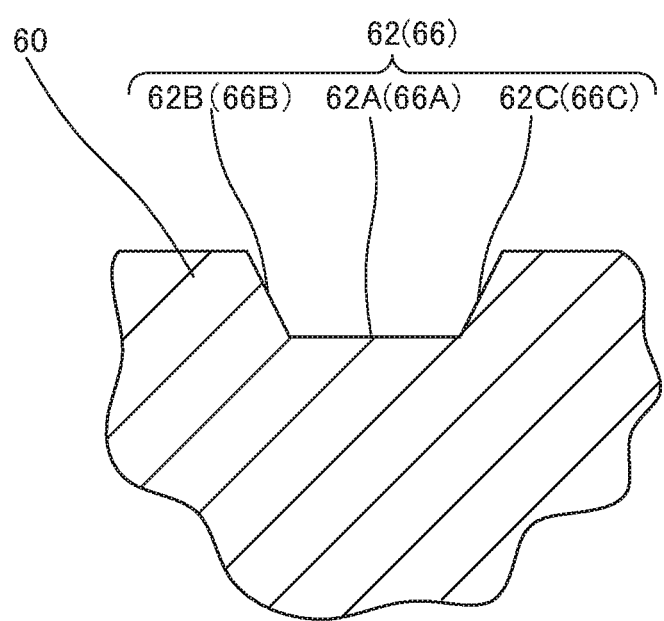
FIG. 5 is a sectional view taken along a B-B line in FIG. 3.

As shown in FIG. 5, the first groove passage 62 includes a bottom portion 62A defining a depth thereof, and first and second side portions 62B, 62C that respectively increase in depth gradually toward the bottom portion 62A in the axial direction of the rotor 60 (a left-right direction in FIG. 5). The first side portion 62B and the second side portion 62C are formed in a tapered shape so as to incline toward the bottom portion 62A. Thus, when the rotor 60 is inserted into the rotor housing hole 51, the first seal member 71, the second seal member 72, and the third seal member 73 are guided by the first side portion 62B and the second side portion 62C so as not to catch on corner portions of the first groove passage 62. As a result, the rotor 60 can be inserted into the rotor housing hole 51 smoothly, thereby preventing the first seal member 71, second seal member 72, and third seal member 73 from being damaged by the corner portions of the first groove passage 62.

As shown in FIG. 3, one of the first throttle passages 63 is formed such that a center thereof is positioned between the first ports 52A, 52B and the second ports 53A, 53B. In other words, the first throttle passage 63 is formed at a remove from the first ports 52A, 52B in the axial direction of the rotor 60 toward one of the openings of the rotor housing hole 51 (in a rightward direction in FIG. 3). Further, the other throttle passage 64 is formed such that a center thereof is removed from the first ports 52A, 52B in the axial direction of the rotor 60 toward the other opening of the rotor housing hole 51 (in a leftward direction in FIG. 3).

Figure 4:
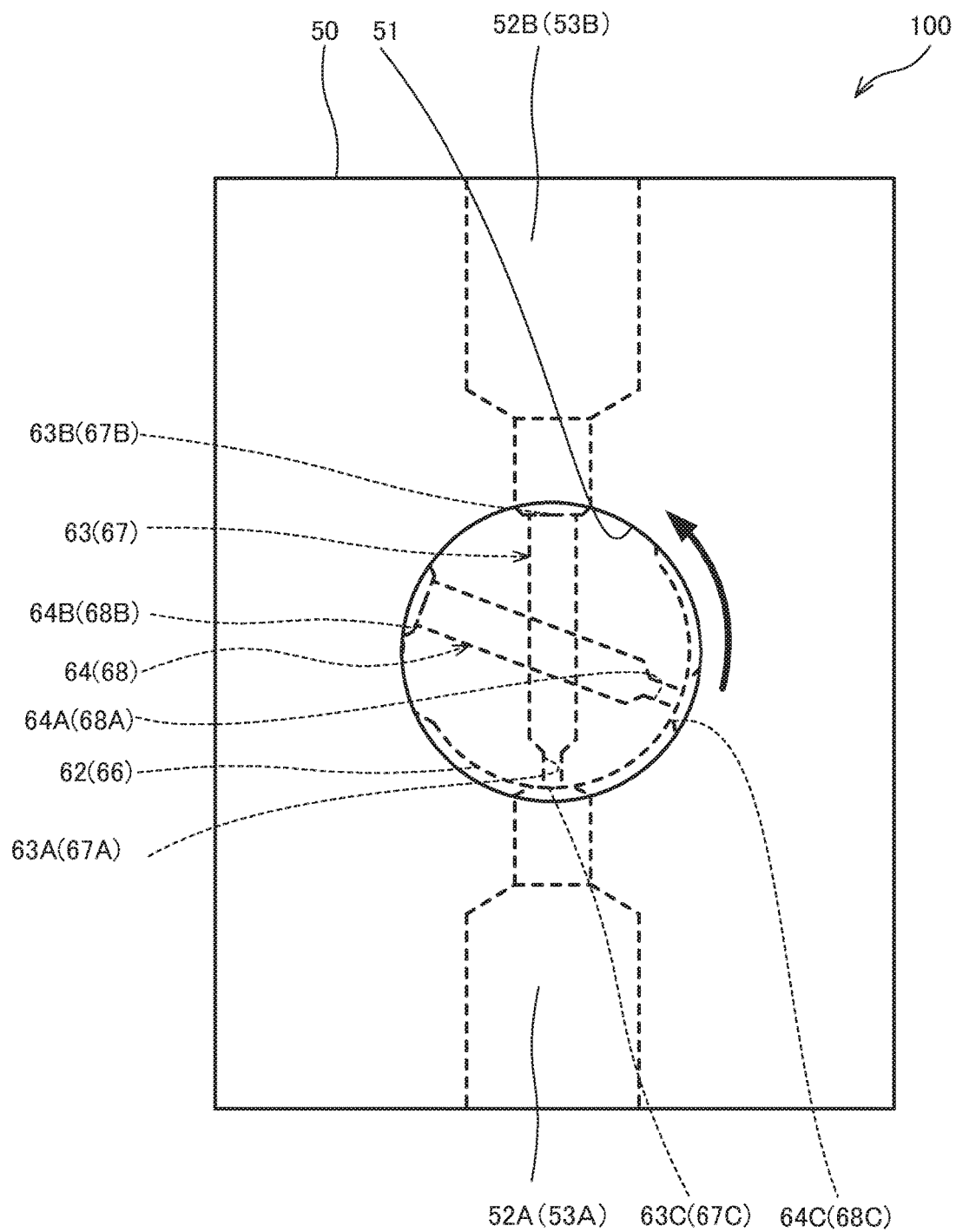
FIG. 4 is a view seen in the direction of an arrow A in FIG. 3, and showing a case in which a wing is in a fully closed condition.

As shown in FIGS. 3 and 4, the first throttle passages 63, 64 include orifice passages 63A, 64A that serve as throttle portions for exerting resistance on the flow of working oil passing therethrough. The resistance exerted on the flow of working oil by the orifice passages 63A, 64A is greater than the resistance exerted thereon by the first groove passage 62. The throttle portions are not limited to the orifice passages 63A, 64A, and orifice plugs provided in the first throttle passages 63, 64, for example, may be used instead.

Elongated hole-shaped opening portions 63B, 63C extending in the axial direction of the rotor 60 are formed at respective ends of the first throttle passage 63. As shown in FIG. 4, elongated hole-shaped opening portions 64B, 64C extending in the axial direction of the rotor are formed at respective ends of the first throttle passage 64. One of the opening portions 63B, 64B of each of the first throttle passages 63, 64 is formed at a remove from the first groove passage 62 so as not to communicate with the first groove passage 62.

As shown in FIG. 3, one of the opening portions 63B, 64B of each of the first throttle passages 63, 64 is formed so as to partially oppose the first ports 52A, 52B as the rotor 60 rotates. The other opening portion 63C, 64C of each of the first throttle passages 63, 64 communicates with the first groove passage 62. When the opening portions 63B, 64B of the first throttle passages 63, 64 oppose the first ports 52A, 52B, the first ports 52A, 52B communicate with each other via the first throttle passages 63, 64 and a part of the first groove passage 62.

The two first throttle passages 63, 64 are formed such that respective extension directions thereof deviate from each other, or in other words formed so as to be removed from each other by a predetermined angle in the circumferential direction of the rotor 60 (see FIG. 4). The first throttle passages 63, 64 are thus formed not to intersect each other.

Next, referring mainly to FIGS. 2, 4, and 6-10, operations of the rotary valve 100 and the fluid pressure actuator unit 10 will be described. FIGS. 6-9, similarly to FIG. 4, are side views showing the rotary valve 100 from the direction of the arrow A in FIG. 3. In FIGS. 6-9, reference numerals in parentheses denote configurations of the second control flow passage 65 corresponding to configurations of the first control flow passage 61. FIG. 10 is a graph showing a relationship between an opening of the wing 2 and the flow rate at which the working oil is supplied to the hydraulic cylinders 20.

To open the wing from the fully closed condition, the switch valve 40 is switched to the first position 40A by driving the pump 31. To ensure that the left wing 2 and the right wing 3 are not opened and closed simultaneously at this time, the switch valve (not shown) of the right wing drive unit 12 is switched to the cutoff position.

As shown in FIG. 2, when the switch valve 40 is switched to the first position 40A, the discharge passage 13 communicates with the first main passage 16 and the discharge passage 15 communicates with the second main passage 17.

When the wing 2 is in the fully closed condition, as shown in FIG. 4, the first ports 52A, 52B communicate with each other through the first throttle passage 63, while communication through the first groove passage 62 is cut off. Therefore, when the wing 2 is opened from the fully closed condition, the first throttle passage 63 exerts greater resistance on the working oil passing through the first main passage 16 than the resistance exerted thereon by the first groove passage 62. Accordingly, as shown in FIG. 10, the working oil discharged by the pump 31 is controlled to a flow rate (referred to hereafter as a "throttle flow rate") corresponding to the resistance exerted thereon by the first throttle passage 63, and supplied thus to the first pressure chambers 24 of the hydraulic cylinders 20 through the first connection passage 18. Working oil that is discharged by the pump 31 but not led to the first pressure chambers 24, or in other words an amount of working oil corresponding to a difference between the flow rate at which the working oil is discharged from the pump 31 and the throttle flow rate at which the working oil passes through the first throttle passage 63, is discharged into the tank 32 through the relief passage 14.

Further, when the wing 2 is in the fully closed condition, the working oil passing through the second main passage 17 is led into the tank 32 through the second throttle passage 67.

Hence, when the working oil controlled to the throttle flow rate by the first throttle passage 63 is supplied to the first pressure chambers 24, the hydraulic cylinders 20 perform an expansion operation at a comparatively low speed. As a result, the wing 2 performs a low-speed opening operation.

Figure 6:
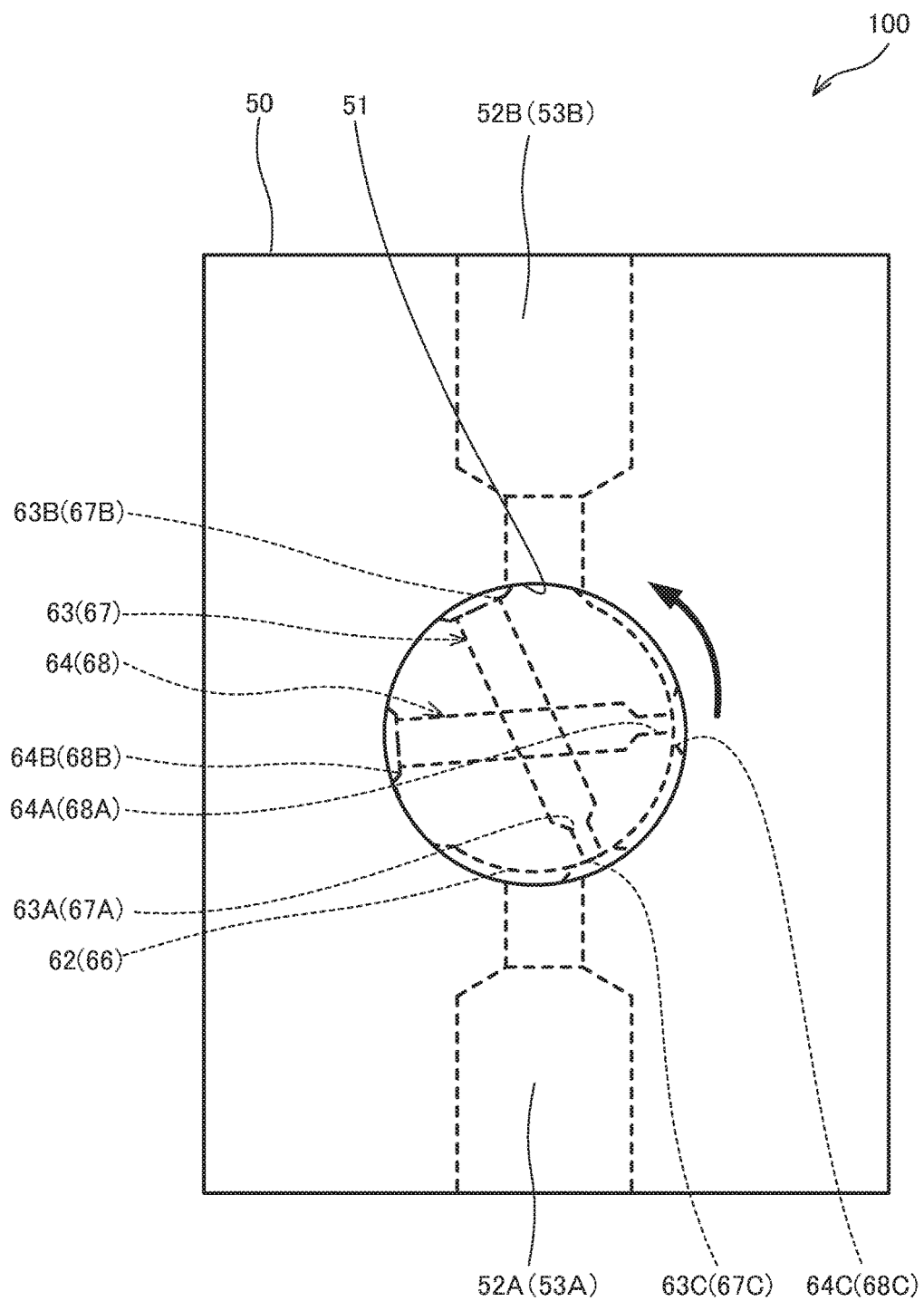
FIG. 6 is a view seen in the direction of the arrow A in FIG. 3, and showing a case in which an opening of the wing has reached a first switch opening.

In response to the expansion operation of the hydraulic cylinders 20, the wing 2 opens by rotating about the rotary shaft 5, and as the wing 2 performs the opening operation, the rotor 60 of the rotary valve 100 rotates counterclockwise in the direction of an arrow shown in FIG. 4. As shown in FIG. 6, when the opening of the wing 2 from the fully closed condition reaches a predetermined value (referred to hereafter as a "first switch opening"), the first ports 52A, 52B communicate with both the first groove passage 62 and one of the first throttle passages 63.

When the wing 2 opens further from the first switch opening, an opening area by which the first throttle passage 63 communicates with the first ports 52A, 52B decreases while an opening area by which the first groove passage 62 communicates therewith increases. Accordingly, as shown in FIG. 10, the flow rate at which the working oil is supplied to the first pressure chambers 24 of the hydraulic cylinders 20 gradually increases, leading to an increase in the speed at which the wing 2 opens.

Figure 7:
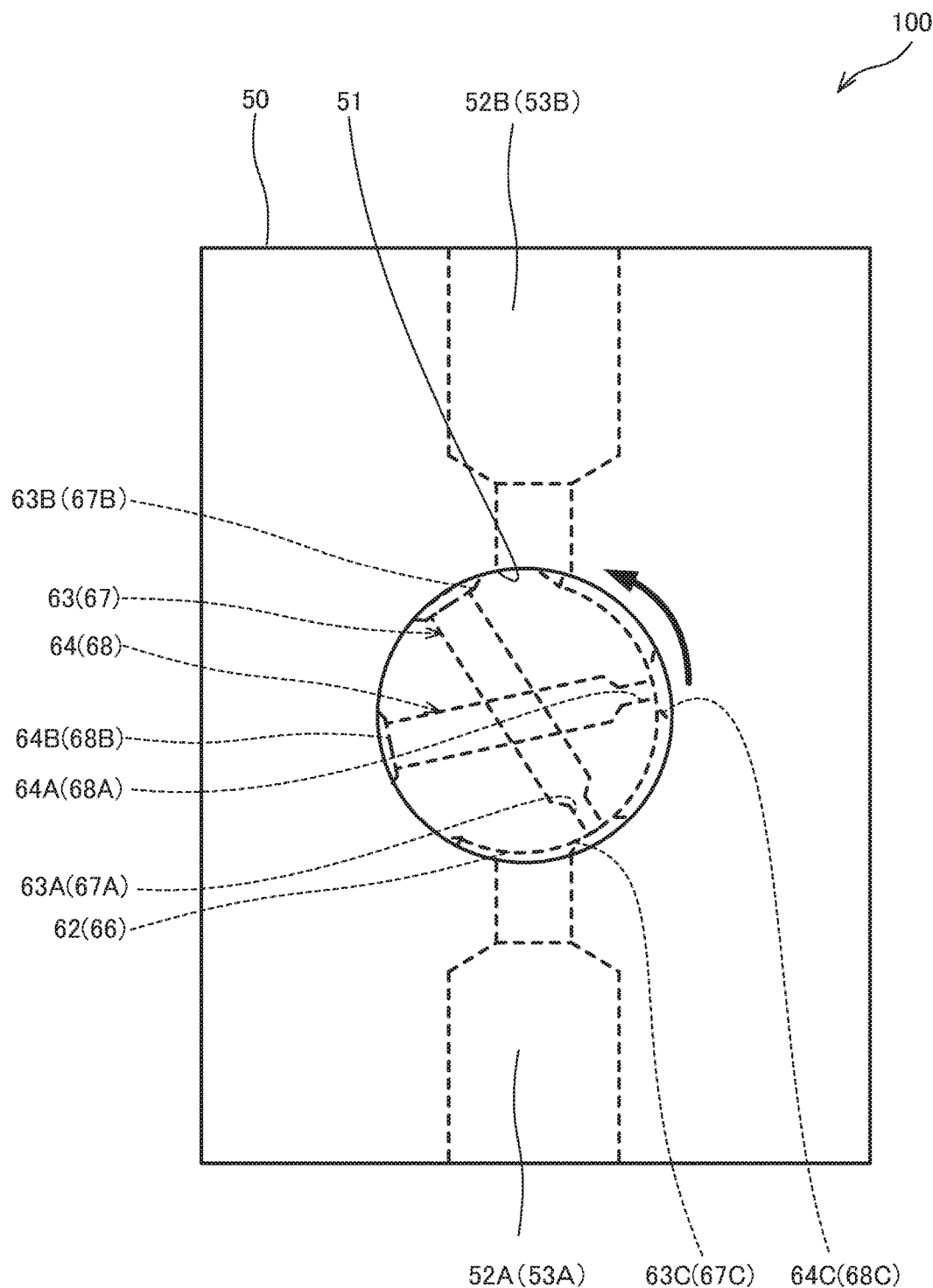
FIG. 7 is a view seen in the direction of the arrow A in FIG. 3, and showing a case in which the opening of the wing has reached a second switch opening.

When the wing 2 opens further such that the opening thereof reaches a second switch opening, as shown in FIG. 7, communication between the first throttle passage 63 and the first ports 52A, 52B is cut off. In other words, when the wing 2 opens to the second switch opening from the fully closed condition, the working oil passing through the first main passage 16 switches so as to pass through the first groove passage 62 instead of passing through the first throttle passage 63.

When the first control flow passage 61 connecting the first ports 52A, 52B switches from the first throttle passage 63 to the first groove passage 62 in this manner, the first groove passage 62 exerts smaller resistance on the working oil than the resistance exerted thereon by the first throttle passage 63. Accordingly, as shown in FIG. 10, the working oil is controlled to a flow rate (referred to hereafter as a "groove flow rate") corresponding to the resistance exerted thereon by the first groove passage 62, or in other words a higher flow rate than the throttle flow rate, and supplied thus to the first pressure chambers 24. Accordingly, the hydraulic cylinders 20 perform an expansion operation at a higher speed than when the working oil passes through the first throttle passage 63, and as a result, the wing 2 performs a high-speed opening operation.

Figure 8:
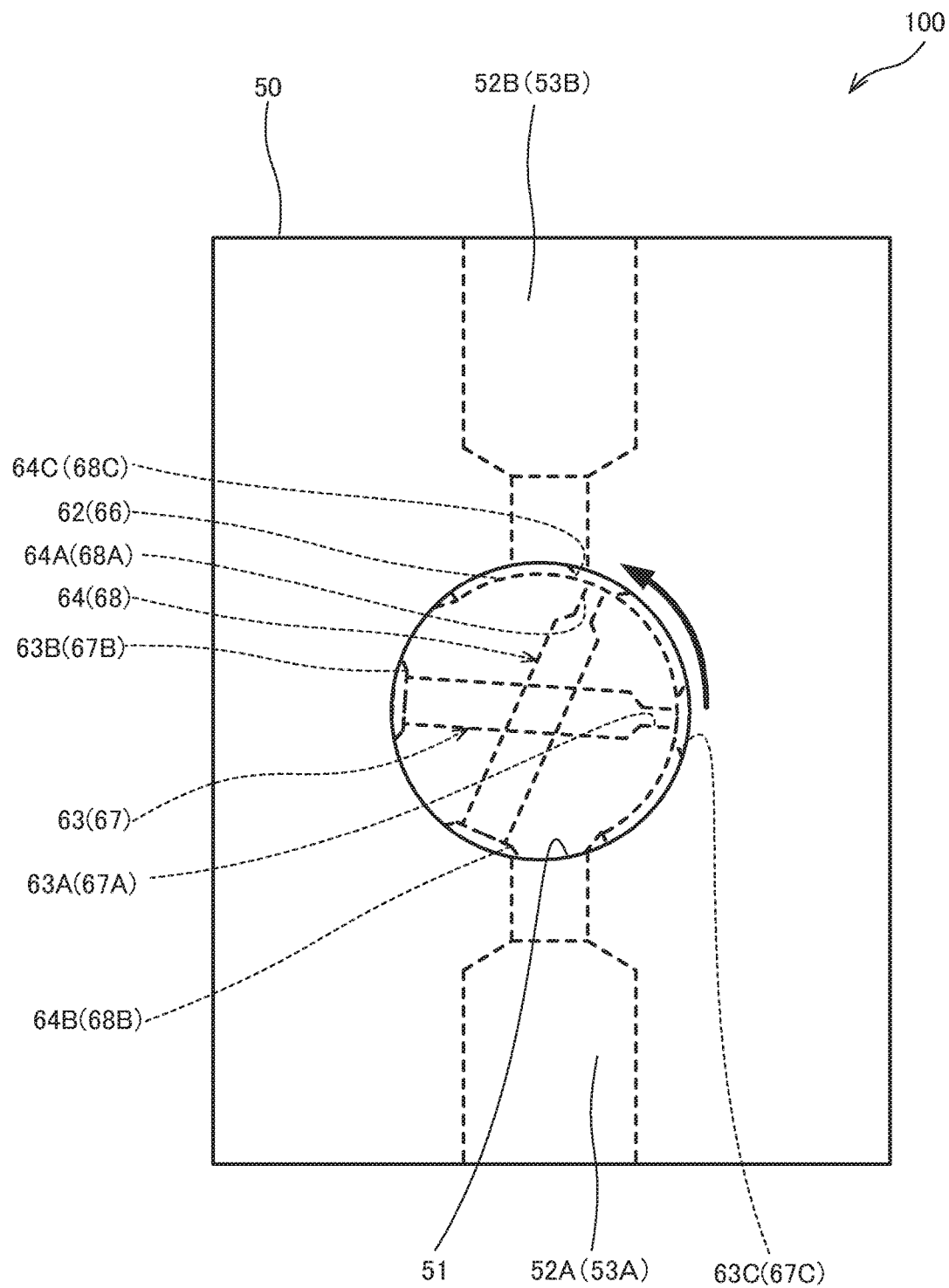
FIG. 8 is a view seen in the direction of the arrow A in FIG. 3, and showing a case in which the opening of the wing has reached a third switch opening.

As shown in FIG. 8, when the wing 2 rotates further from the second switch opening such that the opening of the wing 2 from the fully closed condition reaches a third switch opening in the vicinity of a fully open condition, the first ports 52A, 52B communicate with both the first groove passage 62 and the first throttle passage 64.

When the wing 2 opens further from the third switch opening, the opening area by which the first groove passage 62 communicates with the first ports 52A, 52B decreases while an opening area by which the first throttle passage 64 communicates therewith increases. Accordingly, the flow rate at which the working oil is supplied to the first pressure chambers 24 of the hydraulic cylinders 20 gradually decreases (see FIG. 10).

Figure 9:
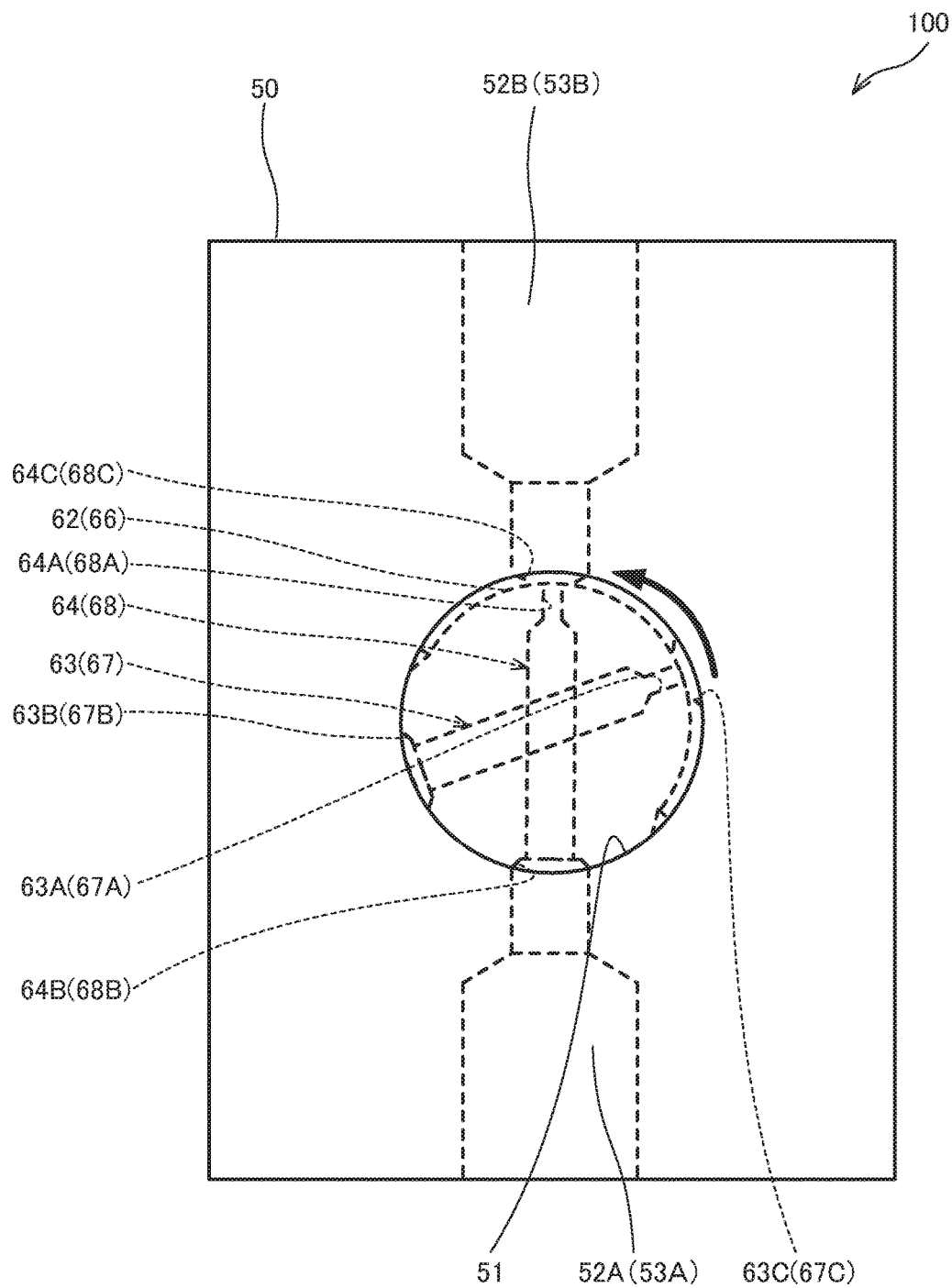
FIG. 9 is a view seen in the direction of the arrow A in FIG. 3, and showing a case in which the opening of the wing has reached a fourth switch opening.
Figure 10:
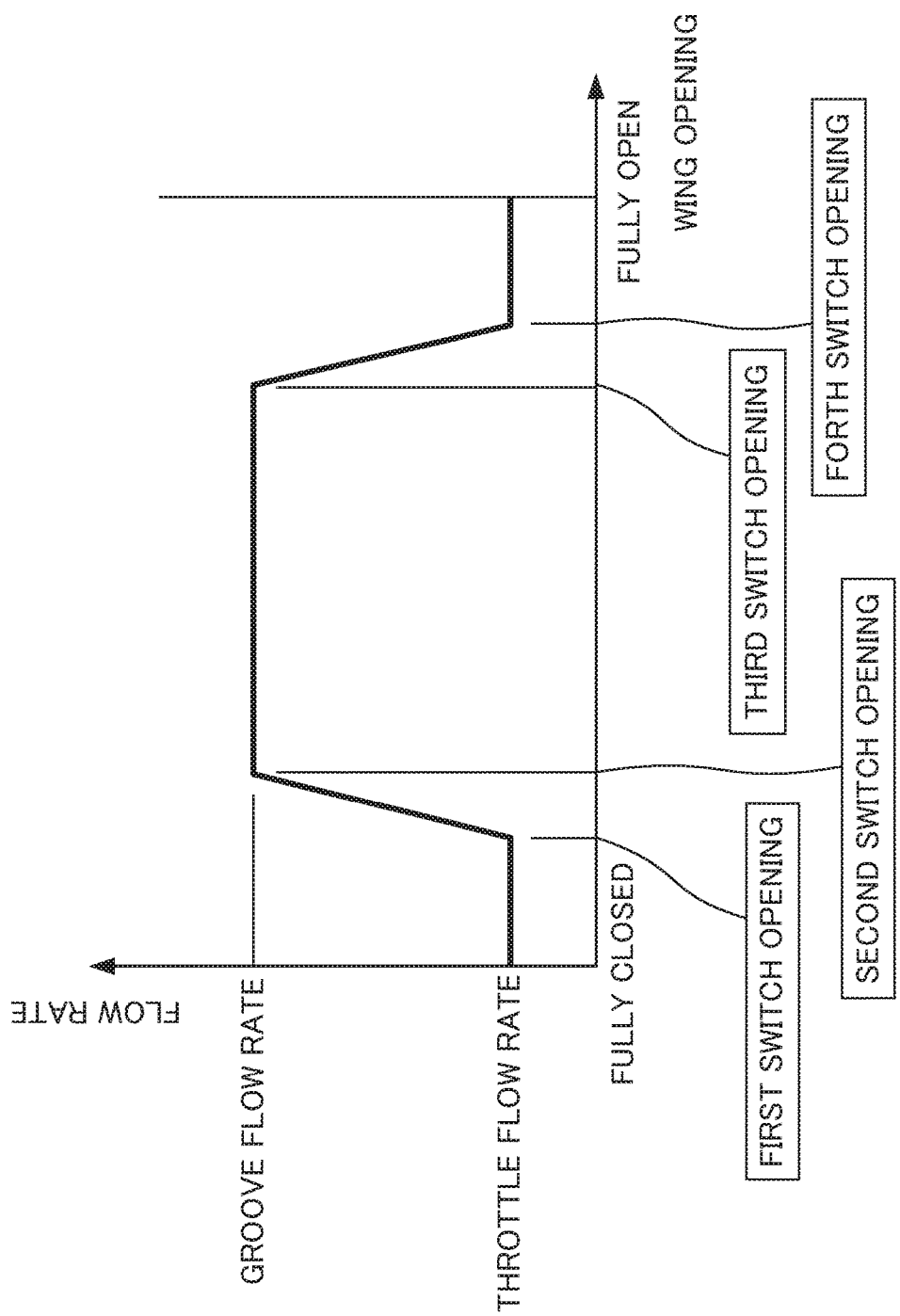
FIG. 10 is a graph showing a relationship between the opening of the wing and a flow rate at which a working fluid is supplied to a fluid pressure actuator of the fluid pressure actuator unit according to the first embodiment of the present invention.

As shown in FIG. 9, when the wing 2 rotates further from the third switch opening such that the opening thereof reaches a fourth switch opening, the first ports 52A, 52B switch from communication through the first groove passage 62 to communication through the first throttle passage 64 alone. In other words, the first control flow passage 61 for connecting the first ports 52A, 52B to each other switches from the first groove passage 62 to the first throttle passage 64. Accordingly, as shown in FIG. 10, working oil controlled back to the throttle flow rate is supplied to the first pressure chambers 24 such that the pair of hydraulic cylinders 20 perform an expansion operation at low speed. As a result, the wing 2 performs a low-speed opening operation likewise when approaching the fully open condition.

Hence, as the rotor 60 rotates in accordance with the rotation of the wing 2, the first control flow passage 61 and the second control flow passage 65 are switched such that the working oil passes through the throttle passage, through the groove passage, or through both the groove passage and the throttle passage. Accordingly, the flow of working oil led through the groove passage and the throttle passages is controlled such that the resistance exerted on the flow of working oil passing through the first control flow passage 61 and the second control flow passage 65 varies. As a result, the flow rate at which the working oil passes through the first main passage 16 and the second main passage 17 is controlled.

When a sensor (not shown) detects that the wing 2 is in the fully open condition, the pump 31 is stopped and the switch valve 40 is switched to the cutoff position 40C. As a result, the hydraulic cylinders 20 are set in a load maintaining condition.

To close the wing 2 from the fully open condition, the switch valve 40 is switched to the second position 40B. When the switch valve 40 is switched to the second position 40B, the discharge passage 13 communicates with the second main passage 17 and the discharge passage 15 communicates with the first main passage 16.

To close the wing 2 from the fully open condition, the working oil discharged by the pump 31 is controlled to the throttle flow rate by the second throttle passage 68, and supplied to the second pressure chambers 25 of the hydraulic cylinders 20 through the second main passage 17 and the second connection passage 19. Similarly to a case in which the wing 2 is opened, the working oil that is discharged by the pump 31 but not led to the second pressure chambers 25 is discharged into the tank 32 through the relief passage 14.

The working oil in the first pressure chambers 24 of the hydraulic cylinders 20 is led into the tank 32 through the first connection passage 18, the first main passage 16, and the first throttle passage 64.

Hence, when the wing 2 is closed from the fully open condition, the pair of hydraulic cylinders 20 performs a contraction operation at a comparatively low speed, and as a result, the wing 2 performs a low-speed closing operation.

When the opening of the wing 2 falls below the third switch opening as the hydraulic cylinders 20 contract, the first control flow passage 61 for connecting the first ports 52A, 52B to each other switches from the first throttle passage 64 to the first groove passage 62. Further, the second control flow passage 65 for connecting the second ports 53A, 53B to each other switches from the second throttle passage 68 to the second groove passage 66. Hence, working oil controlled to the groove flow rate by the second groove passage 66 is supplied to the second pressure chambers 25 through the second main passage 17 and the second connection passage 19, and working oil is discharged into the tank 32 from the first pressure chambers 24 through the first connection passage 18 and the first main passage 16. Accordingly, the pair of hydraulic cylinders 20 perform a contraction operation at a comparatively high speed, and as a result, the wing 2 performs a high-speed closing operation.

When the hydraulic cylinders 20 contract further such that the opening of the wing 2 falls below the first switch opening, the first control flow passage 61 for connecting the first ports 52A, 52B to each other switches from the first groove passage 62 to the first throttle passage 63. Further, the second control flow passage 65 for connecting the second ports 53A, 53B to each other switches from the second groove passage 66 to the second throttle passage 67. Hence, working oil controlled to the throttle flow rate is supplied to the second pressure chambers 25 through the second main passage 17 and the second connection passage 19, and working oil is discharged into the tank 32 from the first pressure chambers 24 through the first connection passage 18 and the first main passage 16. Accordingly, the pair of hydraulic cylinders 20 perform a contraction operation at a comparatively low speed, and as a result, the wing 2 performs a low-speed closing operation to the fully closed condition.

Hence, in the vicinity of the fully closed condition where the opening of the wing 2 falls to or below the first switch opening, and in the vicinity of the fully open condition where the opening of the wing 2 reaches or exceeds the fourth switch opening, the working oil passes only through the first throttle passages 63, 64 and the second throttle passages 67, 68. Therefore, when the wing 2 is in the vicinity of the fully closed condition and the fully open condition, the flow rate at which the working oil is supplied to the hydraulic cylinders 20 is controlled by the rotary valve 100 so that the hydraulic cylinders 20 expand and contract at low speed. As a result, impacts generated at the start and end of the opening and closing operations of the wing 2 can be reduced. Further, when the opening of the wing 2 is within a predetermined range from the second switch opening up to and including the third switch opening, the working oil passes only through the first groove passage 62 and the second groove passage 66. Hence, the wing 2 can be opened and closed at high speed at times other than the start and end of the opening and closing operations, and as a result, the time required for the opening and closing operations can be reduced.

By discharging the working oil in the first pressure chambers 24 into the tank 32 through the first throttle passages 63, 64 during the contraction operation, back pressure generated when the working oil passes through the first throttle passages 63, 64 acts on the first pressure chambers 24. As a result, a situation in which the hydraulic cylinders 20 contract and fall under the weight of the wing 2 at the start and end of the closing operation of the wing 2 can be prevented from occurring.

To reduce the impacts generated at the start and end of the opening and closing operations of the wing 2, the opening and closing operations of the wing 2 may be performed using hydraulic cylinders having a cushion mechanism instead of using the rotary valve 100. In this case, however, back pressure (cushion pressure) generated by a cushioning action causes a hose pipe connecting the pump 31 to the hydraulic cylinders to expand, and when the pump 31 is stopped, the hose pipe attempts to return to its original condition. As a result, the hydraulic cylinders expands or contracts slightly even after the pump 31 is stopped, making it difficult to stop the opening/closing operation of the wing 2 at the same time as the pump 31 is stopped.

With the fluid pressure actuator unit 10 having the rotary valve 100, on the other hand, the hydraulic cylinders 20 are caused to expand and contract at low speed by controlling the flow rate of the working oil using the rotary valve 100 at the start and end of the opening and closing operations of the wing 2. The hydraulic cylinders 20 can therefore be caused to expand and contract at low speed without providing a cushion mechanism that generates back pressure, and as a result, the impacts generated at the start and end of the opening and closing operations of the wing 2 can be reduced, and the opening and closing operations of the wing 2 can be stopped at the same time as the pump 31 is stopped.

According to the embodiment described above, the following effects are obtained.

According to the rotary valve 100, the resistance exerted on the flow of working oil by the first control flow passage 61 and the second control flow passage 65 varies as the rotor 60 rotates in accordance with the rotation of the wing 2, whereby the flow rate at which the working oil passes through the rotary valve 100 is controlled. Hence, the flow rate of the working oil can be controlled without using an electric component such as a sensor, and therefore a reduction in the controllability of the hydraulic cylinders 20 due to a sensor defect or the like can be prevented. As a result, the controllability of the hydraulic cylinders 20 that cause the wing 2 to rotate about the rotary shaft 5 can be improved.

Moreover, since the rotary valve 100 does not require an electric component to control the flow rate, the cost thereof can be reduced.

Further, according to the rotary valve 100, the first control flow passage 61 and the second control flow passage 65 are formed in the single rotor 60. Therefore, the flow rate of the working oil during both the expansion and contraction operations of the hydraulic cylinders 20 can be controlled using the single rotary valve 100. As a result, the fluid pressure actuator unit 10 can be configured compactly.

Furthermore, in the rotary valve 100, the first groove passage 62 of the first control flow passage 61 and the second groove passage 66 of the second control flow passage 65 respectively include the first side portions 62B, 66B and the second side portions 62C, 66C that gradually increase in depth toward the bottom portions 62A, 66A. Therefore, when the rotor 60 is inserted into the rotor housing hole 51, the first seal member 71, the second seal member 72, and the third seal member 73 can be prevented from being damaged by the corner portions of the first groove passage 62 and the second groove passage 66.

Further, in the fluid pressure actuator unit 10, the hydraulic cylinders 20 are caused to expand and contract at low speed at the start and end of the opening and closing operations of the wing 2 by controlling the flow rate at which the working oil is supplied to and discharged from the hydraulic cylinders 20 using the rotary valve 100. The rotary valve 100 can be mounted simply by coupling the rotor 60 to the rotary shaft 5 so as to be connected to the first main passage 16 and second main passage 17, and therefore the rotor 60 can be mounted easily on the existing wing vehicle 1. As a result, the impacts generated at the start and end of the opening and closing operations of the wing 2 can be reduced easily even in an existing wing vehicle in which the hydraulic cylinders 20 do not include a cushion mechanism.

Furthermore, according to the fluid pressure actuator unit 10, the hydraulic cylinders 20 can be caused to expand and contract at low speed without depending on a cushion mechanism provided in the hydraulic cylinders 20. Therefore, a situation in which the hydraulic cylinders 20 continue to expand and contract after the pump 31 is stopped due to back pressure generated by the cushioning action does not occur. As a result, starting and stopping positions of the wing 2 can be controlled with a high degree of precision.

Next, a modified example of the first embodiment will be described. The first control flow passage 61 will be described below as an example, and description of the second control flow passage 65 will be omitted.

In the first embodiment, the first control flow passage 61 is switched as the rotor 60 rotates such that the working oil passes through the first throttle passage 63, 64, through the first groove passage 62, or through both the first groove passage 62 and the first throttle passage 63, 64. The first control flow passage 61 is not limited thereto, and may be formed in a desired shape in accordance with a desired control characteristic by which to control the flow rate of the working oil using the rotary valve 100. For example, the working oil may flow through the first groove passage 62 alone at the start and end of the opening and closing operations of the wing 2, and through the first groove passage 62 and one of the first throttle passages 63, 64 at all other times. In this case, the working oil passing through the first control flow passage 61 is controlled to the groove flow rate when the wing 2 starts and stops, and to a flow rate constituted by a sum of the groove flow rate and the throttle flow rate at all other times. As a result, the wing 2 can be opened and closed at low speed when the wing 2 starts and stops, and at high speed at all other times. Hence, in a case where the first control flow passage 61 includes the first groove passage 62 and the first throttle passages 63, 64, the manner in which the first control flow passage 61 varies the resistance exerted on the flow of working oil passing therethrough by controlling the flow of working oil led through the first groove passage 62 and the first throttle passages 63, 64 as the rotor 60 rotates may be set as desired.

Moreover, the first control flow passage 61 includes the first groove passage 62 and the first throttle passages 63, 64, but as long as the first control flow passage 61 varies the resistance exerted on the flow of working oil passing therethrough as the rotor 60 rotates, the first control flow passage 61 may be formed in any desired shape. For example, the first control flow passage may include only a groove passage formed in the circumferential direction, and the groove passage may be formed such that a flow passage sectional area thereof is smaller in respective circumferential direction end portions than in a central portion. The respective end portions of the groove passage having the reduced flow passage sectional area exert greater resistance on the flow of working oil than the resistance exerted on the flow of working oil by the central portion. In other words, the resistance exerted on the flow of working oil passing through the first control flow passage 61 is varied by varying the opening area by which the groove passage communicates with the first ports 52A, 52B (the first main passage 16), and thereby varying the flow passage sectional area, as the rotor 60 rotates. More specifically, when the wing 2 starts and stops, the working oil passes through the respective end portions of the groove passage having the reduced flow passage sectional area, and is thereby controlled to a comparatively low flow rate. At the start and end of the opening and closing operations, therefore, the wing 2 opens and closes at low speed. Further, at times other than when the wing 2 starts and stops, the working oil passes through the central portion of the groove passage, which has a comparatively large flow passage sectional area, in accordance with the rotation of the rotor 60, and is thereby controlled to a comparatively high flow rate. At times other than the start and end of the opening and closing operations, therefore, the wing 2 opens and closes at high speed. By varying the opening area of the first control flow passage 61 relative to the first ports 52A, 52B (the first main passage 16) as the rotor 60 rotates in this manner, the first control flow passage 61 varies the resistance exerted on the flow of working oil passing therethrough.

Second Embodiment

Next, referring to FIG. 11, a rotary valve 200 according to a second embodiment of the present invention will be described. The following description will focus on differences to the first embodiment, and therefore configurations that are identical to the rotary valve 100 according to the first embodiment have been allocated identical reference numerals, and description thereof has been omitted.

In the first embodiment, the rotor 60 of the rotary valve 100 is formed in a substantially columnar shape, and the rotor housing hole 51 in the housing 50 is formed as a through hole having a circular cross-section.

Figure 11:
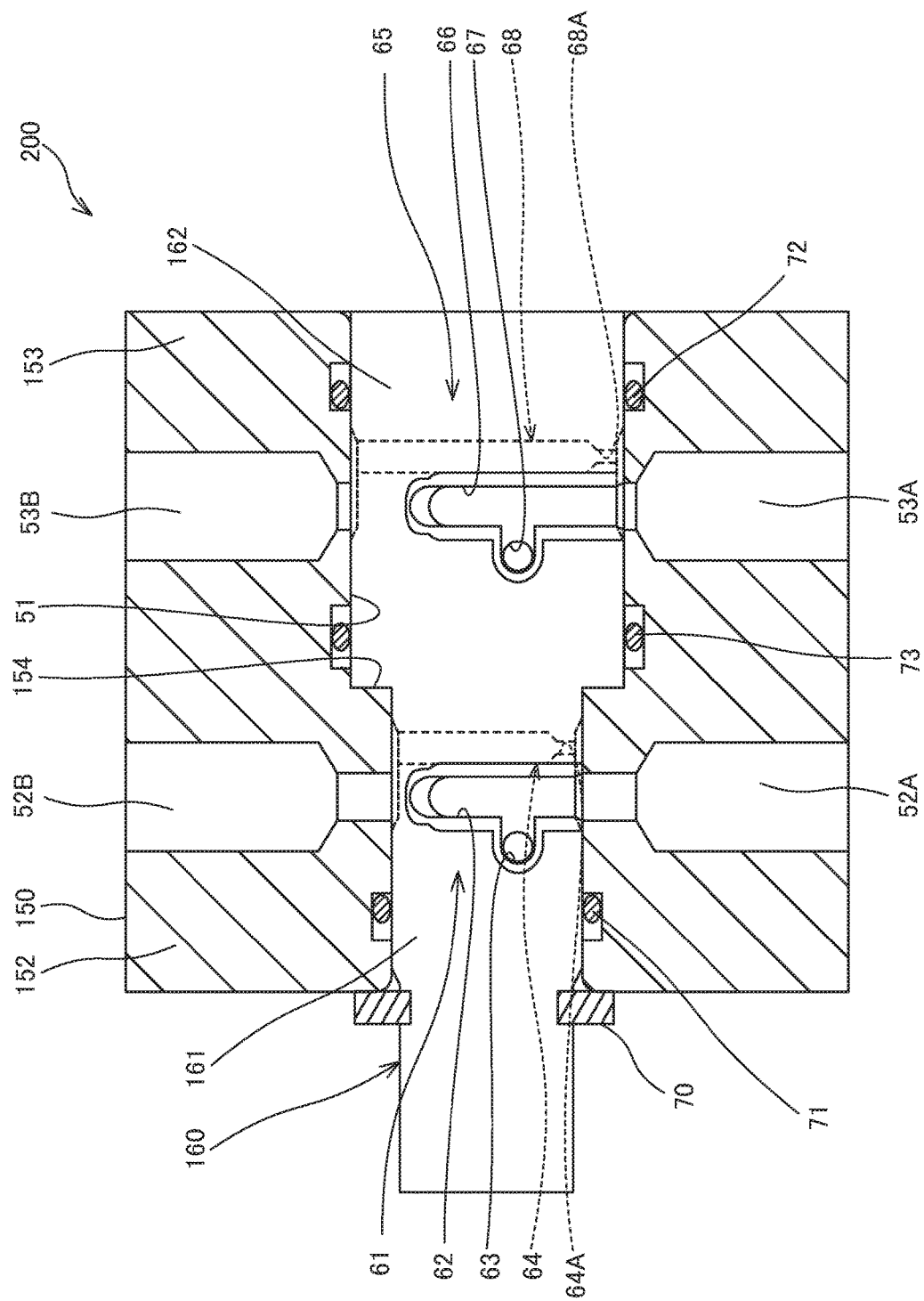
FIG. 11 is a sectional view showing a rotary valve according to a second embodiment of the present invention.

In the rotary valve 200, however, as shown in FIG. 11, a housing 150 includes a first housing portion 152 in which the first main passage 16 is formed, a second housing portion 153 in which the second main passage 17 is formed, the second housing portion 153 being formed with a larger inner diameter than the first housing portion 152, and a step portion 154 formed between the first housing portion 152 and the second housing portion 153. A rotor housing hole 151 is formed in a stepped shape.

The third seal member 73 is provided in a position between the step portion 154 and the second main passage 17 in an axial direction of a rotor 160 as a seal member for sealing a gap between the housing 150 and the rotor 160. Further, the rotor 160 includes a first shaft portion 161 inserted into the first housing portion 152, a second shaft portion 162 inserted into the second housing portion 153 and formed to have a larger outer diameter than the first shaft portion 161, and a shaft-side step portion 163 formed between the first shaft portion 161 and the second shaft portion 162 so as to contact the step portion 154.

According to the second embodiment, described above, similar effects to the first embodiment are obtained. Moreover, the following effects are obtained.

According to the rotary valve 200, a radial direction gap is formed between the first shaft portion 161 and the second housing portion 153, and therefore the rotor 160 can be inserted smoothly into the rotor housing hole 151 without bringing the first shaft portion 161 into contact with the second seal member 72 and the third seal member 73. As a result, the rotary valve 200 can be assembled more easily.

Further, the step portion 154 and the shaft-side step portion 163 function as one of the retainers, and therefore only one snap ring 70 need be provided on the first shaft portion 161. As a result, the number of components can be reduced.

Configurations, actions, and effects of the embodiments of the present invention will be summarized below.

A rotary valve 100, 200 for controlling a flow rate at which a working fluid is supplied to and discharged from a fluid pressure actuator (the hydraulic cylinders 20) that causes a drive subject (the wings 2, 3) to rotate about a rotary shaft 5 includes a rotor 60, 160 that rotates as the drive subject (the wings 2, 3) rotates about the rotary shaft 5, and a control flow passage (the first control flow passage 61, the second control flow passage 65) formed in the rotor 60, 160 to control the flow rate at which the working fluid is supplied to and discharged from the fluid pressure actuator (the hydraulic cylinders 20), wherein the control flow passage (the first control flow passage 61, the second control flow passage 65) varies a resistance exerted on a flow of the working fluid passing therethrough as the rotor 60, 160 rotates.

According to this configuration, the flow rate at which the working fluid passes through the rotary valve 100, 200 is controlled by rotating the rotor 60, 160 in accordance with the rotation of the drive subject (the wings 2, 3) so as to vary the resistance exerted on the flow of the working fluid by the control flow passage (the first control flow passage 61, the second control flow passage 65). Hence, the flow rate of the working fluid can be controlled without using an electric component such as a sensor, and as a result, a reduction in the controllability of the fluid pressure actuator (the hydraulic cylinders 20) due to a sensor defect or the like can be prevented.

With this configuration, therefore, the controllability of the fluid pressure actuator (the hydraulic cylinders 20) that causes the drive subject (the wings 2, 3) to rotate about the rotary shaft 5 can be improved.

Further, in the rotary valve 100, 200, the control flow passage (the first control flow passage 61, the second control flow passage 65) includes a groove passage (the first groove passage 62, the second groove passage 66) formed in an outer periphery of the rotor 60 so as to extend in a circumferential direction, and a throttle passage (the first throttle passages 63, 64, the second throttle passages 67, 68) that opens onto an outer peripheral surface of the rotor 60 at both ends and exerts a different resistance on the working fluid to the resistance exerted on the working fluid by the groove passage (the first groove passage 62, the second groove passage 66), and varies the resistance exerted on the flow of the working fluid passing therethrough by controlling a flow of the working fluid led into the groove passage (the first groove passage 62, the second groove passage 66) and the throttle passage (the first throttle passages 63, 64, the second throttle passages 67, 68) as the rotor 60 rotates.

According to this configuration, the resistance exerted by the control flow passage (the first control flow passage 61, the second control flow passage 65) as a whole on the working fluid passing therethrough is varied by rotating the rotor 60 in accordance with the rotation of the wings 2, 3 so as to control the flow of the working fluid led into the groove passage (the first groove passage 62, the second groove passage 66) and the throttle passage (the first throttle passages 63, 64, the second throttle passages 67, 68). Thus, the flow rate of the working fluid passing through the rotary valve 100, 200 is controlled. In so doing, the flow rate of the working fluid can be controlled without using an electric component such as a sensor, and as a result, a reduction in the controllability of the fluid pressure actuator (the hydraulic cylinders 20) due to a sensor defect or the like can be prevented.

Further, in the rotary valve 100, 200, the throttle passage (the first throttle passages 63, 64, the second throttle passages 67, 68) exerts a greater resistance on the flow of the working fluid passing therethrough than the resistance exerted on the flow of the working fluid by the groove passage (the first groove passage 62, the second groove passage 66), and as the rotor 60, 160 rotates, the control flow passage (the first control flow passage 61, the second control flow passage 65) is switched such that the working fluid passes through the throttle passage (the first throttle passages 63, 64, the second throttle passages 67, 68), through the groove passage (the first groove passage 62, the second groove passage 66), or through both the groove passage (the first groove passage 62, the second groove passage 66) and the throttle passage (the first throttle passages 63, 64, the second throttle passages 67, 68).

According to this configuration, by rotating the rotor 60, 160 in accordance with the rotation of the drive subject (the wings 2, 3), the working fluid is switched so as to pass through the throttle passage (the first throttle passages 63, 64, the second throttle passages 67, 68), through the groove passage (the first groove passage 62, the second groove passage 66), or through both the groove passage (the first groove passage 62, the second groove passage 66) and the throttle passage (the first throttle passages 63, 64, the second throttle passages 67, 68), whereby the resistance exerted on the flow of the working fluid is varied. Thus, the flow rate of the working fluid passing through the rotary valve 100, 200 is controlled. Hence, the flow rate of the working fluid can be controlled without using an electric component such as a sensor, and as a result, a reduction in the controllability of the fluid pressure actuator (the hydraulic cylinders 20) due to a sensor defect or the like can be prevented.

Further, the rotary valve 100, 200 also includes a housing 50, 150 into which the rotor 60, 160 is inserted to be free to rotate, the groove passage (the first groove passage 62, the second groove passage 66) includes a bottom portion (the bottom portions 62A, 65A) that defines the depth thereof and a first side portion (the first side portions 62B, 65B) and a second side portion (the second side portions 62C, 65C) that respectively increase in depth gradually toward the bottom portion (the bottom portions 62A, 65A) in an axial direction of the rotor 60, 160, and a seal member (the first seal member 71, the second seal member 72, the third seal member 73) is provided between the housing 50, 150 and the rotor 60, 160 to block communication between the control flow passage (the first control flow passage 61, the second control flow passage 65) and the exterior of the housing 50, 150.

According to this configuration, the seal member (the first seal member 71, the second seal member 72, the third seal member 73) is guided by the first side portion (the first side portions 62B, 65B) and the second side portion (the second side portions 62C, 65C), and therefore does not catch on corner portions of the groove passage (the first groove passage 62, the second groove passage 66). As a result, the rotor 60, 160 can be inserted into the housing 50, 150 smoothly.

With this configuration, damage to the seal member (the first seal member 71, the second seal member 72, the third seal member 73) can be prevented, and the rotary valve 100, 200 can be assembled more easily.

Further, the fluid pressure actuator is a hydraulic cylinder 20 that performs expansion and contraction operations in accordance with a differential pressure between a first pressure chamber 24 and a second pressure chamber 25, and the rotary valve 100, 200 also includes a single housing 50, 150 into which the rotor 60, 160 is inserted singly to be free to rotate, a rotor housing hole 51, 151 formed in the housing 50, 150 to house the rotor 60, 160, a first main passage 16 that is formed in the housing 50, 150 so as to communicate with the rotor housing hole 51, 151, and supplies and discharges the working oil to and from the first pressure chamber 24, a second main passage 17 that is formed in the housing 50, 150 so as to communicate with the rotor housing hole 51, 151, and supplies and discharges the working fluid to and from the second pressure chamber 25, a first control flow passage 61 that serves as the control flow passage in order to control a flow rate at which the working fluid passes through the first main passage 16, and a second control flow passage 65 that serves as the control flow passage in order to control a flow rate at which the working fluid passes through the second main passage 17.

According to this configuration, the first control flow passage 61 and the second control flow passage 65 are formed in the single rotor 60, and therefore the flow rate of the working oil during both the expansion and contraction operations of the hydraulic cylinder 20 can be controlled by the single rotary valve 100, 200.

With this configuration, the fluid pressure actuator unit 10 can be configured compactly.

Further, in the rotary valve 200, the housing 150 includes a first housing portion 152 in which the first main passage 16 is formed, a second housing portion 153 in which the second main passage 17 is formed, the second housing portion 153 being formed to have a larger inner diameter than the first housing portion 152, and a step portion 154 formed between the first housing portion 152 and the second housing portion 153, and a third seal member 73 is provided in a position between the step portion 154 and the second main passage 17 in the axial direction of the rotor 160 in order to seal a gap between the housing 150 and the rotor 160.

According to this configuration, a radial direction gap is formed between the rotor 160 and the second housing portion 153, and therefore the rotor 160 can be inserted smoothly into the rotor housing hole without bringing the part of the rotor 160 housed in the first housing portion 152 into contact with the third seal member 73.

With this configuration, damage to the third seal member 73 can be prevented, and the rotary valve 200 can be assembled more easily.

Further, in the rotary valve 100, 200, the drive subject is a wing 2, 3 that is coupled to an upper portion of a cargo compartment 4 of a wing vehicle 1 to be free to rotate, and is opened and closed in a vertical direction.

Furthermore, the fluid pressure actuator unit 10 includes the fluid pressure actuator (the hydraulic cylinders 20) that is driven by the fluid pressure of the working fluid so as to cause the drive subject (the wings 2, 3) to rotate about the rotary shaft 5, a pump 31 that leads the working fluid to the fluid pressure actuator (the hydraulic cylinders 20), a switch valve 40 that switches a flow of the working fluid led to the fluid pressure actuator (the hydraulic cylinders 20) from the pump 31, and the rotary valve 100, 200 that controls the flow rate at which the working fluid is led to the fluid pressure actuator (the hydraulic cylinders 20), wherein the rotary valve 100, 200 includes the rotor 60, 160 that rotates as the drive subject (the wings 2, 3) rotates about the rotary shaft 5, and the control flow passage (the first control flow passage 61, the second control flow passage 65) that is formed in the rotor 60, 160 to control the flow rate at which the working fluid is supplied to and discharged from the fluid pressure actuator (the hydraulic cylinders 20), and the control flow passage (the first control flow passage 61, the second control flow passage 65) varies the resistance exerted on the flow of the working fluid passing therethrough as the rotor 60, 160 rotates.

According to this configuration, the flow rate at which the working fluid passes through the rotary valve 100, 200 is controlled by rotating the rotor 60, 160 in accordance with the rotation of the drive subject (the wings 2, 3) so as to vary the resistance exerted on the flow of the working fluid by the control flow passage (the first control flow passage 61, the second control flow passage 65). Hence, the flow rate of the working fluid can be controlled without using an electric component such as a sensor, and as a result, a reduction in the controllability of the fluid pressure actuator (the hydraulic cylinders 20) due to a sensor defect or the like can be prevented.

Further, in the fluid pressure actuator unit 10, the drive subject is the wing 2, 3 that is coupled to the upper portion of the cargo compartment 4 of the wing vehicle 1 to be free to rotate and is opened and closed in a vertical direction, the control flow passage includes the groove passage (the first groove passage 62, the second groove passage 66) formed in the outer periphery of the rotor 60 so as to extend in the circumferential direction and the throttle passage (the first throttle passages 63, 64, the second throttle passages 67, 68) that opens onto the outer peripheral surface of the rotor 60 at both ends and exerts a greater resistance on the flow of the working fluid passing therethrough than the resistance exerted on the flow of the working fluid by the groove passage (the first groove passage 62, the second groove passage 66), and the working fluid passes through the throttle passage (the first throttle passages 63, 64, the second throttle passages 67, 68) when the wing 2, 3 is opened and closed from a fully closed condition and a fully open condition, and passes through the groove passage (the first groove passage 62, the second groove passage 66) when an opening of the wing 2, 3 is within a predetermined range (equal to or greater than the second switch opening and equal to or smaller than the third switch opening).

According to this configuration, the flow rate at which the working fluid is supplied to the fluid pressure actuator (the hydraulic cylinders 20) is controlled by the rotary valve 100, 200 in the vicinity of the fully closed condition and the fully open condition of the wing 2, 3 such that the fluid pressure actuator (the hydraulic cylinders) is driven at low speed.

With this configuration, impacts generated at the start and end of the opening and closing operations of the wing 2, 3 can be reduced.

Embodiments of this invention were described above, but the above embodiments are merely examples of applications of this invention, and the technical scope of this invention is not limited to the specific constitutions of the above embodiments.

In the embodiments described above, the fluid pressure actuator causes the wing 2, 3 of the wing vehicle 1 to rotate about the rotary shaft 5 as the drive subject. Instead, for example, the drive subject may be a tailgate provided on the rear of the cargo compartment 4 of the wing vehicle 1, and the fluid pressure actuator unit 10 may be used as a tailgate lifter for opening and closing/raising and lowering the tailgate. Hence, the drive subject may be any component that rotates about the rotary shaft 5.

Further, in the above embodiments, the first control flow passage 61 and the second control flow passage 65 are formed in the single rotor 60, and the flow rate at which the working oil is supplied to and discharged from the hydraulic cylinders 20 is controlled by the single rotary valve 100, 200. Instead, the flow rate at which the working oil is supplied to and discharged from the hydraulic cylinders 20 may be controlled by providing a rotary valve for controlling the flow rate at which the working oil passes through the first main passage 16 and a rotary valve for controlling the flow rate at which the working oil passes through the second main passage 17 separately. In this case, only one control flow passage need be formed in the rotor 60, 160.

Furthermore, in the above embodiments, the rotary valve 100, 200 controls both the flow rate at which the working oil passes through the first main passage 16 and the flow rate at which the working oil passes through the second main passage 17. Instead, the flow rate at which the working oil passes through the first main passage 16 for supplying and discharging the working oil to and from the first pressure chambers 24, on which the weight of the wing 2 (a load) acts, may be controlled alone. In this case, an expansion speed of the hydraulic cylinders 20 is controlled by controlling the flow rate at which the working oil is supplied to the first pressure chambers 24, and a contraction speed of the hydraulic cylinders 20 is controlled by controlling the flow rate at which the working oil is discharged from the first pressure chambers 24.

Moreover, in the above embodiments, the rotary valve 100, 200 is provided substantially centrally in the front-rear direction in the upper portion of the cargo compartment 4 of the wing vehicle 1. Instead, the rotary valve 100, 200 may be provided on the rear side or the front side of the vehicle.

Furthermore, for example, a link mechanism in which a link coupled at one end to the cargo compartment 4 and a link coupled at one end to the wing 2, 3 are coupled to each other at respective other ends thereof via a rotary shaft so as to rotate relative to each other as the wing 2, 3 opens and closes may be provided. In this case, the rotor 60, 160 of the rotary valve 100, 200 is coupled to the rotary shaft of the link mechanism. Likewise in this case, the rotor 60, 160 rotates as the wing 2, 3 opens and closes via the link mechanism, and therefore similar effects to those of the above embodiments are obtained. Hence, the rotary valve 100, 200 may be configured as desired as long as the rotor 60, 160 rotates as the wing 2, 3 opens and closes.

Further, in the above embodiments, the fluid pressure actuator is constituted by the hydraulic cylinders 20 that expand and contract using working oil supplied thereto and discharged therefrom through a pipe from the pump 30 provided under the floor of the cargo compartment 4. The switch valve 40 and the rotary valve 100 are interposed in the pipe connecting the pump unit 30 to the hydraulic cylinders 20. Instead, the hydraulic cylinders 20, the pump 31, the electric motor for driving the pump 31, the tank 32, the switch valve 40, and the rotary valve 100, 200 may be formed integrally in the fluid pressure actuator unit 10.

Moreover, in the above embodiments, the fluid pressure actuator is constituted by the hydraulic cylinders 20 that expand and contract in accordance with the differential pressure between the first pressure chamber 24 and the second pressure chamber 25. Instead, the fluid pressure actuator may be a fluid pressure motor that outputs rotary driving force in accordance with fluid pressure supplied thereto, and the wing 2, 3 may be opened and closed vertically by transmitting the rotary driving force to the rotary shaft 5.

This application claims priority based on Japanese Patent Application No. 2014-254488 filed with the Japan Patent Office on Dec. 16, 2014, the entire contents of which are incorporated into this specification.

The invention claimed is:

1. A rotary valve for controlling a flow rate of a working fluid that is supplied to and discharged from a fluid pressure actuator that causes a drive subject to rotate about a rotary shaft, comprising:
   a rotor coaxially coupled to the rotary shaft to synchronously rotate with the rotary shaft; and
   a control flow passage formed in the rotor to control the flow rate of the working fluid that is supplied to and discharged from the fluid pressure actuator,
   wherein the control flow passage varies a resistance exerted on a flow of the working fluid passing therethrough as the rotor rotates.

2. The rotary valve as defined in claim 1, wherein the drive subject is a wing that is coupled to an upper portion of a cargo compartment of a wing vehicle to be free to rotate, and is opened and closed in a vertical direction.

3. A fluid pressure actuator unit comprising:
   the rotary valve as defined in claim 1;
   the fluid pressure actuator, which is configured to be driven by fluid pressure from the working fluid so as to cause the drive subject to rotate about the rotary shaft;
   a pump that is configured to lead the working fluid to the fluid pressure actuator; and
   a switch valve that is configured to switch a flow of the working fluid led to the fluid pressure actuator from the pump.

4. The fluid pressure actuator unit as defined in claim 3, wherein the drive subject is a wing that is coupled to an upper portion of a cargo compartment of a wing vehicle to be free to rotate, and is opened and closed in a vertical direction,
   the control flow passage comprises:
   a groove passage formed in an outer periphery of the rotor so as to extend in a circumferential direction; and
   a throttle passage that opens onto an outer peripheral surface of the rotor at both ends and exerts a greater resistance on the flow of the working fluid than a resistance exerted on the flow of the working fluid by the groove passage, and
   the working fluid passes through the throttle passage when the wing is opened and closed from a fully closed condition and a fully open condition, and passes through the groove passage when an opening of the wing is within a predetermined range.

5. A rotary valve for controlling a flow rate of a working fluid that is supplied to and discharged from a fluid pressure actuator that causes a drive subject to rotate about a rotary shaft, comprising:
   a rotor that is configured to rotate as the drive subject rotates about the rotary shaft; and
   a control flow passage formed in the rotor to control the flow rate of the working fluid that is supplied to and discharged from the fluid pressure actuator, wherein
   the control flow passage includes:
   a groove passage formed in an outer periphery of the rotor so as to extend in a circumferential direction; and
   a throttle passage that opens onto an outer peripheral surface of the rotor at both ends and exerts a different resistance on the working fluid to a resistance exerted on the working fluid by the groove passage, and
   the control flow passage varies a resistance exerted on a flow of the working fluid passing therethrough by controlling a flow of the working fluid led into the groove passage and the throttle passage as the rotor rotates.

6. The rotary valve as defined in claim 5, wherein
   the throttle passage exerts a greater resistance on the flow of the working fluid than the resistance exerted on the flow of the working fluid by the groove passage, and
   as the rotor rotates, the control flow passage is switched such that the working fluid passes through the throttle passage, through the groove passage, or through both the groove passage and the throttle passage.

7. The rotary valve as defined in claim 5, further comprising a housing into which the rotor is inserted to be free to rotate, wherein
the groove passage comprises:
a bottom portion that defines a depth thereof; and
a first side portion and a second side portion that respectively increase in depth gradually toward the bottom portion in an axial direction of the rotor, and
a seal member is provided between the housing and the rotor to block communication between the control flow passage and the exterior of the housing.

8. A rotary valve for controlling a flow rate of a working fluid that is supplied to and discharged from a fluid pressure actuator that causes a drive subject to rotate about a rotary shaft, comprising:
a rotor that is configured to rotate as the drive subject rotates about the rotary shaft; and
a control flow passage formed in the rotor to control the flow rate of the working fluid that is supplied to and discharged from the fluid pressure actuator, wherein
the control flow passage varies a resistance exerted on a flow of the working fluid passing therethrough as the rotor rotates,
the fluid pressure actuator is a fluid pressure cylinder that performs expansion and contraction operations in accordance with a differential pressure between a first pressure chamber and a second pressure chamber, and
the rotary valve further includes:
a single housing into which the rotor is inserted singly to be free to rotate;
a rotor housing hole formed in the housing to house the rotor;
a first main passage that is formed in the housing so as to communicate with the rotor housing hole, and supplies and discharges the working fluid to and from the first pressure chamber;
a second main passage that is formed in the housing so as to communicate with the rotor housing hole, and supplies and discharges the working fluid to and from the second pressure chamber;
a first control flow passage that serves as the control flow passage in order to control a flow rate of the working fluid that passes through the first main passage; and
a second control flow passage that serves as the control flow passage in order to control a flow rate of the working fluid that passes through the second main passage.

9. The rotary valve as defined in claim 8, wherein the housing comprises:
a first housing portion in which the first main passage is formed;
a second housing portion in which the second main passage is formed, the second housing portion being formed to have a larger inner diameter than the first housing portion; and
a step portion formed between the first housing portion and the second housing portion, and
a seal member is provided in an axial direction position between the step portion and the second main passage to seal a gap between the housing and the rotor.

* * * * *